Oct. 17, 1944.   J. G. MEJEAN   2,360,572
CONTROL DEVICE
Filed May 28, 1941   4 Sheets-Sheet 1
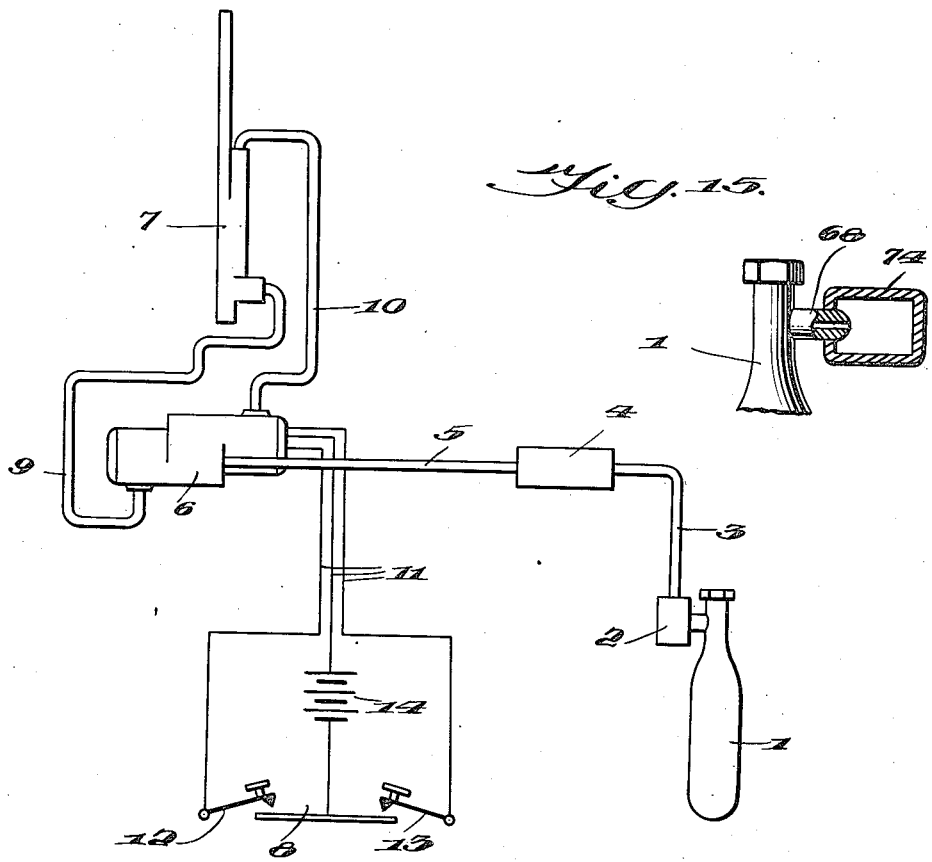
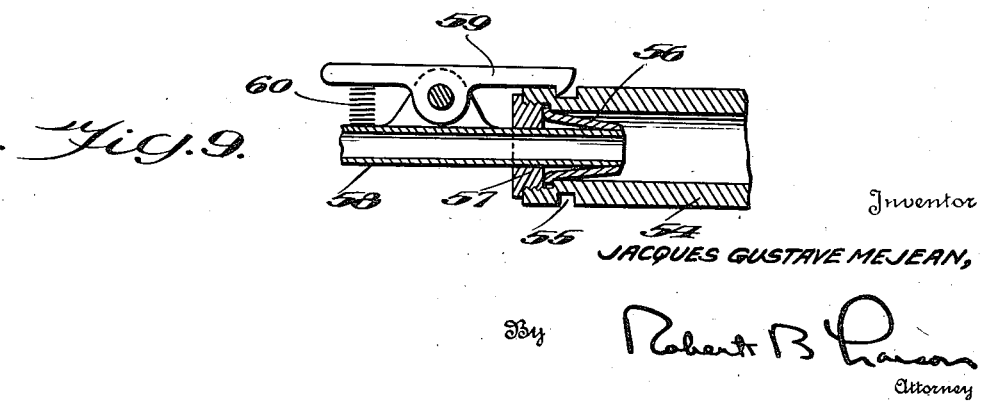
Inventor
JACQUES GUSTAVE MEJEAN,
By Robert B. Parson
Attorney Oct. 17, 1944.  J. G. MEJEAN  2,360,572
CONTROL DEVICE
Filed May 28, 1941  4 Sheets-Sheet 2

Inventor
JACQUES GUSTAVE MEJEAN,
By Robert B Larson
Attorney

Oct. 17, 1944.  J. G. MEJEAN  2,360,572
CONTROL DEVICE
Filed May 28, 1941  4 Sheets-Sheet 3
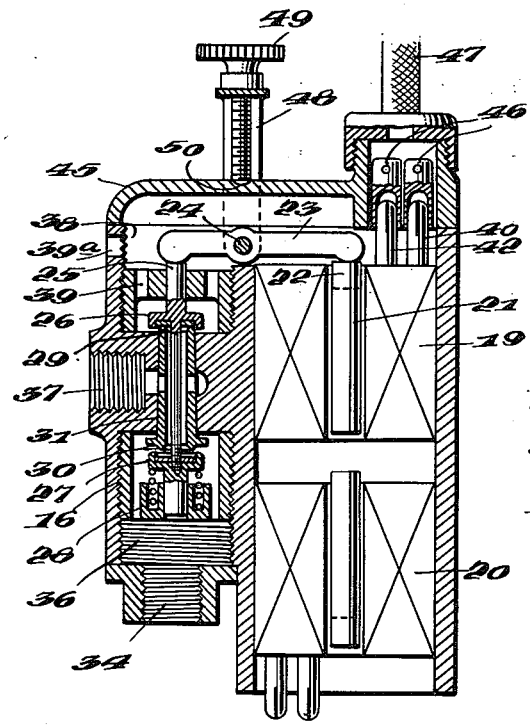
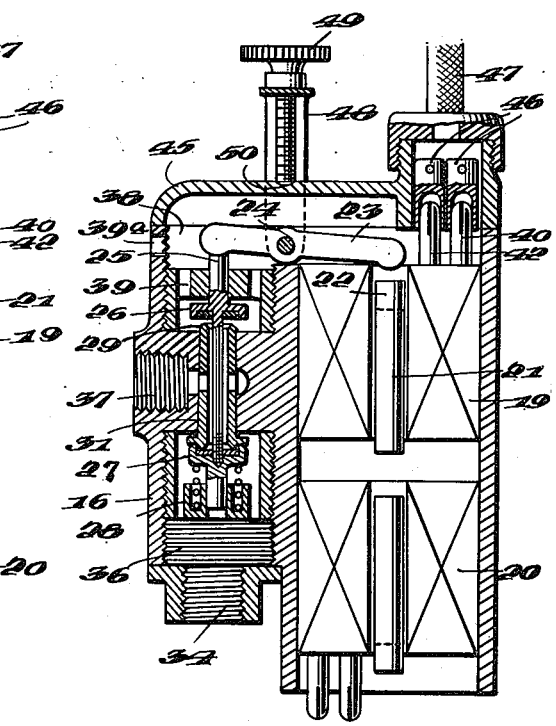
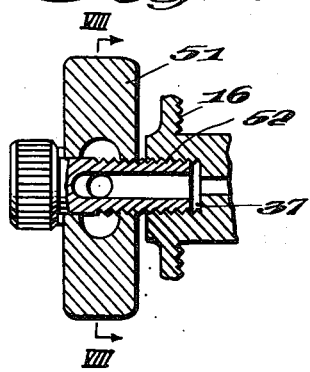
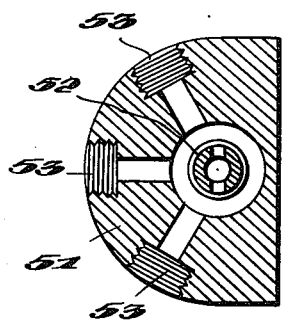
Inventor
JACQUES GUSTAVE MEJEAN,
By Robert B. Larson
Attorney Oct. 17, 1944.　　J. G. MEJEAN　　2,360,572
CONTROL DEVICE
Filed May 28, 1941　　4 Sheets-Sheet 4
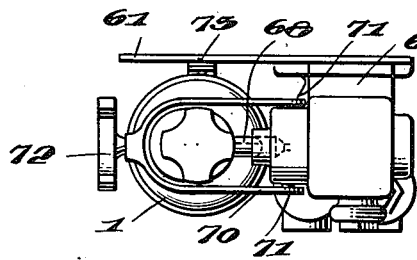
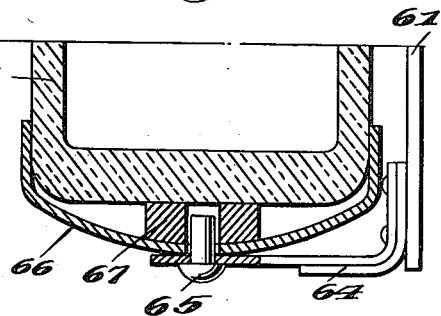
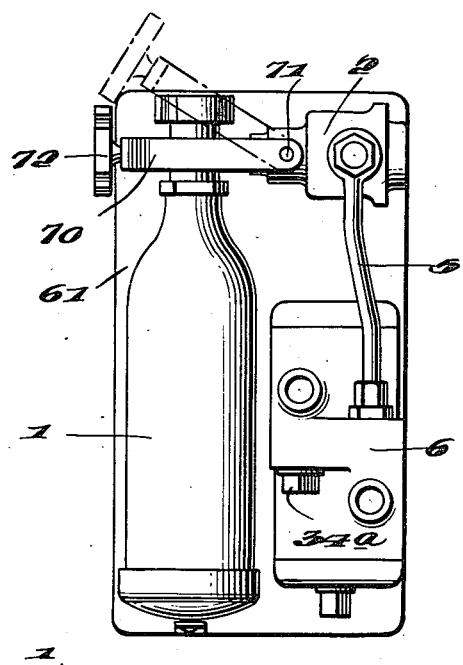
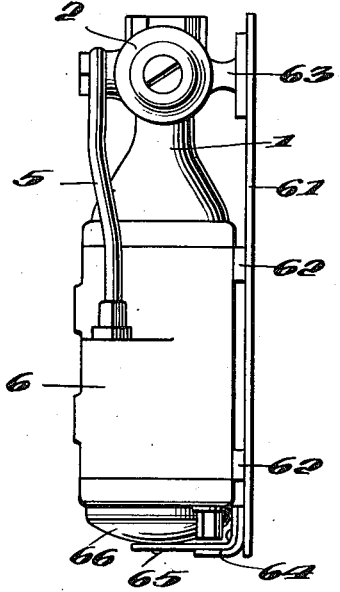
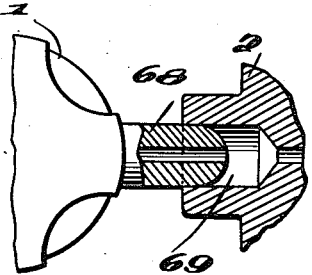
Inventor
JACQUES GUSTAVE MEJEAN,
By Robert B Pearson
Attorney Patented Oct. 17, 1944

2,360,572

UNITED STATES PATENT OFFICE 2,360,572

CONTROL DEVICE

Jacques Gustave Mejean, Geneva, Switzerland, assignor, by mesne assignments, to Helfeda, S. A., Geneva, Switzerland, a Swiss company Application May 28, 1941, Serial No. 395,687
In France February 1940

2 Claims. (Cl. 137—144)

The present invention relates to a control device and particularly to such a device as is adapted for use in a system for the remote control of machine guns, rapid firing cannon, and the like. Such a system is illustrated and described in my copending application Serial No. 378,285, filed February 10, 1941, of which this present application is a continuation-in-part.

While the control device forming the subject matter of the present specification has many and varied uses, it will be described here as applied to a gun control system, particularly a system designed to control gun fire on an airplane. The present device because of certain features it embodies obviates many of the disadvantages in control devices and systems previously employed for such purposes.

As described in my copending application, the remote control of an ordinance piece involves the problem of obtaining two very distinct movements: (1) the firing which causes the projectile to leave the gun, and (2) the reloading, which when an automatic gun fails to work, results in loading a new shell. More specifically, and particularly with aircraft ordinance, the problem consists in obtaining these movements at some distance from the point they take place, with the slightest consumption of energy and with great rapidity.

The control device to be specifically described is admirably effective in the carrying out of these objects.

In general the device is an electrically controlled valve arrangement disposed near the gun to be controlled and adapted selectively to control the passage of gas or fluid under pressure for the purpose of firing the gun, or reloading the same. The body of the device has an axis of symmetry and is so constructed as to be capable of being connected up in a variety of ways to best suit certain conditions.

The principal object of the invention is to provide a control device which meets the rigid requirements of speed and accuracy such as are necessary for gun control on aircraft and regardless of position or temperature conditions to which the device may be subjected.

More specifically, it is an object of the invention to provide a control device having electromagnets therein each for controlling, for example, two valves arranged head to head so that when one opens the other closes and vice versa.

A further object of the invention is the provision of a control device having a plurality of connecting points or terminals arranged symmetrically in relation to the axis of the device so as to render the device capable of being selectively employed in any one of a number of positions best suited for various purposes.

Still a further object of the invention is the provision of a control device for guns disposed on aircraft, said control device being disposed near the guns to be controlled and near a source of the gas or fluid under pressure, but adapted to be actuated from a remote point on the aircraft by electrical means.

The invention has for a further object the provision of an electrically operated control valve for a fluid pressure system, said valve being actuated by electromagnets acting by impact thus making it possible to employ electromagnets of very small size.

Still a further object of the invention resides in a small convenient mount for the device and the flask containing the gas or fluid under pressure.

Other objects will be more apparent from the following description and claims when read on the accompanying drawings, in which:

Fig. 1 is a diagrammatic view of a control system for a gun, which control system employs the present invention.

Fig. 4 is a cross section taken on the line IV—IV of Fig. 3 showing the valve in one position.

Fig. 5 is a similar view to Fig. 4 but showing the valve in the other position.

Fig. 7 is a detail view partly in section of a lead-out member, which may be used in connection with the invention.

Fig. 8 is a view on the line VIII—VIII of Fig. 7.

Fig. 9 is a detail view, partly in cross section, of a coupling device which may be used with the invention.

Fig. 10 is a front elevation of a mounting for the invention.

Fig. 11 is a top plan view of the mounting of Fig. 10.

Fig. 12 is a side elevation of the mounting of Figs. 10 and 11.

Fig. 13 is an enlarged detail view partly in section and showing the manner of attachment of the flask.

Fig. 14 is an enlarged detail view partly in section of the connection between the flask and the expansion valve.

Fig. 15 is an enlarged detail view of a capsule for recharging the flask.

Figure 2:
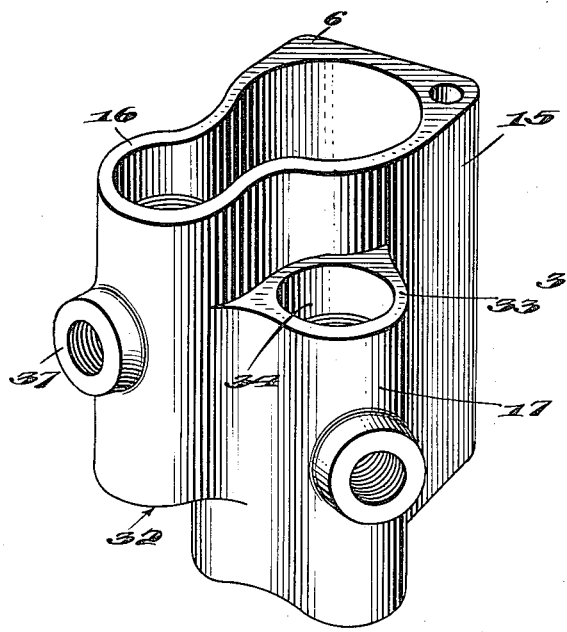
Fig. 2 is a perspective view of the body of a device constructed in accordance with the invention.

So that some conception may be had of a use of the invention in a control system, the device is shown, by way of example, in Fig. 1 as disposed in a control system for guns of the rapid firing type.

In Fig. 1 the reference numeral 1 indicates a flask or container for a source of energy which may be gas under pressure in the nature of 150 to 200 kg. per cm$^2$. The flask is provided with an expansion valve 2 for keeping the gas at a pressure, for example, of 20 kg. per cm$^2$. Means of a known type may be used to permit the flask to be rapidly disconnected and replaced without removing the expansion valve 2. Later on in this specification a new and improved means for connecting and disconnecting the flask will be described.

The expansion valve 2 is connected by means of a conduit 3 to a small tank 4 which in turn is connected by conduit 5 to the electrically controlled valve device 6. The valve device 6 and the flask 1 are disposed near the device to be controlled pnuematically, which in Fig. 1 is the gun 7.

The valve device 6 is itself controlled electrically from a control post 8 which is remote from it. For example, where the arrangement is used to control a gun mount in the wing of an airplane, the flask 1 and the valve device 6 would be positioned in the immediate vicinity of the gun while the valve device 6 would be controlled electrically from a control post 8 situated in the pilot's cockpit.

The valve device 6 is connected by a tube or conduit 9 to the gun 7 for the purpose of controlling the firing of the gun. The conduit 9 is placed in operative connection with the conduit 5 by the valve device 6 when it is desired to fire the gun, as will be described in detail hereinafter. The valve device 6, moreover, is connected to the gun by another tube or conduit 10 which serves for supplying pressure to the gun for reloading the same, as will also be described more fully.

The valve device 6 is connected to the control post 8 by means of an electrical circuit comprising three electric lines 11, the switches 12 and 13, and a source of current such as the battery 14. The circuit is such that the closing of the switch 12 results in the valve device 6 establishing a connection between the conduit 5 and the conduit 9. When the switch 13 is closed, the valve device 6 establishes a connection between the same conduit 5 and the conduit 10.

Figure 6:
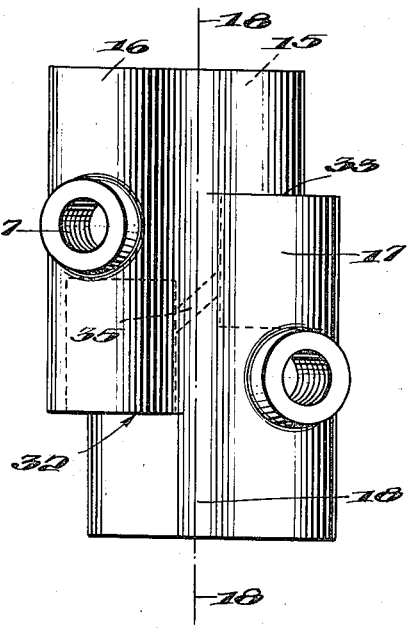
Fig. 6 is a side elevation of the device shown in Fig. 2.
Figure 3:
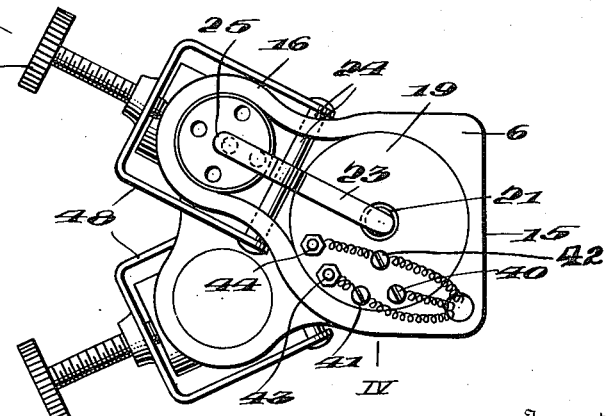
Fig. 3 is a top plan view of the invention.

The valve device 6, as shown in detail in Figs. 2, 3, 4, 5 and 6 is comprised of a body formed of a part 15 generally of parallelepipedic shape, banked by two parts 16 and 17 of approximately semicylindrical shape and arranged symmetrically with relation to the axis 18. The axis 18 is, moreover, an axis of symmetry of all of the elements of the body of the valve device 6.

Within the part 15 are arranged two coaxially disposed electromagnets 19 and 20, more clearly shown in Fig. 4. The electromagnet 19 controls a valve arrangement in the part 16, while the electromagnet 20 controls a similar valve arrangement disposed in the part 17. For purposes of simplification of the description, only those elements relating to the electromagnet 19 and the valve arrangement disposed in the part 16 will be described.

Disposed within the electromagnet 19 is a core 21 ending in a non-magnetic part 22 which is arranged to act by impact on one end of a rocker lever 23, pivoting around a pin 24. The rocker lever 23 through its other end acts on a movable member 25. The member 25 is joined to the movable part of two valve parts 26, 27, arranged head to head, so that when one opens the other closes, and vice versa. A spring 28 acts on the member 25 urging it upwardly in a direction opposite to that which it undergoes when actuated by the rocker lever 23 by the impact of the core 21.

The valve parts 26 and 27 act against two seats 29, 30, ground in a single member 31 of conical shape and disposed in a recess of corresponding shape in the part 16.

The end 32 of the part 16, and the end 33 of the part 17, both have an admission opening 34 to provide for a connection between the conduit 5 and the valve device 6. An interior passage 35 (see Fig. 6) connects the two admission openings 34. The arrangement is, therefore, such that it is possible to connect the conduit 5 to the body of the valve device 6 at either one of the two ends of the body. It is, of course, understood that the admission opening not selected is closed by a suitable plug such as 34a (Fig. 10).

The gas under pressure which reaches the chamber 36, located adjacent the valve 27—30, is put into communication with the outlet 37 and the connected conduit 9 when this valve 27—30 is open. At the moment when the valve 27—30 is closed and, consequently, the valve 26—29 is open, the outlet 37 is put into communication with the atmosphere through the openings 39 and the aperture 39a located in the region 38 in which the rocker lever 23 is disposed. It is noted that, therefore, the cone forming the member 31 is disposed in such a way that the gas pressure tends to keep the member 31 in place in its seat.

The arrangement described, with particular relation to the two valves and the rocker lever 23, gives rise to the advantage of easy grinding of the seats of the valves and further permits the elimination of two joints which would otherwise be necessary if the sealing were to be obtained by the clamping of the cone 31.

When the valve is closed as shown in Fig. 5, it will be noted that the end 22 of the core 21 is disposed in spaced relationship to the end of the rocker lever 23. At the moment when the core 21 is attracted by the electromagnet 19 towards the position shown in Fig. 4, it acquires great speed before contacting the large arm of the rocker lever 23. At the moment of contact there is an impact which results in an opening of the valve parts 27—30.

Because of the particular arrangement shown and described in which the first part of the valve movement is caused by an impact blow, it is possible to employ electromagnets or solenoids which are about three times smaller than those which would ordinarily be required for opening the valve. This is of considerable advantage where a device is used in connection with aircraft.

At each end of the body 15, there are two groups of elements for leading the electric current to the electromagnets. These are arranged symmetrically in relation to the axis 18. These elements are the three studs 40, 41 and 42 connected as follows: the first, to one of the ends of the electromagnet 19; the second, to one of the ends of the electromagnet 20; and the third, to the other end of the winding of the two electromagnets. The binding posts of the electromagnet 20 are indicated by the reference numerals 43 and 44. It is the three studs 40, 41 and 42 which, as will be described, are connected to the three electrical lines seen in Fig. 1.

A cover 45 (Figs. 4 and 5), provided with three sockets 46, is adapted to be placed on either end of the valve device 6. The sockets 46 are arranged to engage with the corresponding studs 40, 41 and 42 so as to connect them to the electrical lines 11. These latter are arranged within a sheath 47 affixed to the cover 45 which can be seen from Figs. 4 and 5. The cover is held in position by means of a clip 48 (Figs. 3, 4 and 5) hinged around the pin 24 of the rocker lever. A screw 49, the end of which is adapted to enter a small depression 50 in the cover 45 is used to secure the clip in position.

It will be noted that because of the symmetrical arrangement of the two groups of studs 40, 41 and 42, the electrical lines serving to energize the electromagnets may be connected to either end of the body of the valve device 6. The end of the valve device 6 not covered by the cover 45 is provided with a simple covering structure not shown except partially in Fig. 3. Such a cover is held in place by the same type of attachment means as that previously indicated by the reference numerals 48, 49 and the depressions 50.

Attention is now directed to Figs. 7 and 8 in which a lead-out member or distributor 51 is shown. This is attached to the valve device 6 by means of a hollow screw 52 which screws into the threaded opening 37. The member 51 is provided with three outlet openings 53 in each of which can be screwed a threaded pipe 54, one end of which has been shown in larger scale in Fig. 9. The purpose of the distributor 51 is to enable the valve device to operate a number (in this case three) of guns or other instruments to be controlled.

Each pipe 54 (see Fig. 9) near its end is provided with a groove 55. In its mouth is a sealing member 56 of conical shape made of leather or rubber, for example, and which is held in place by means of a plug nut 57. It is the conduit 9 which is intended to be connected to a pipe 54. This may be accomplished, for example, through the medium of a ferrule 58 provided with a pivoted hook 59 urged by the spring 60. When the end of the ferrule is engaged in the mouth of the member 54, the hook 59 becomes engaged in the groove 55 and the ferrule is thus retained in place. At the moment when pressure is established within the member 54, this pressure deforms the sealing member 56 and thus automatically assures a tight seal. To disconnect the ferrule it is only necessary to depress the opposite end of the hook 59 after the pressure within the member 54 has been diminished.

Referring again to Fig. 1, the conduit 9 at its other end is connected to a metal bellows (not shown), which metal bellows is connected in such manner as to operate (upon expanding) the trigger mechanism of the gun or other device to be controlled, all as clearly illustrated and described in my copending application Serial No. 378,285.

Thus, upon operation of the electromagnet 19, and consequent operation of the valve structure described, the gas pressure reaches the inside of the bellows, thus causing the bellows to expand downwardly, and actuates the gun. The firing of the gun is, therefore, effected by operating the switch 12 shown in Fig. 1. In a similar manner the reloading of the gun is accomplished through operation of the switch 13. The conduits such as 10, serving to supply the pressure for reloading the gun may be connected by means (such as those shown in Figs. 7, 8 and 9) to an outlet in the valve device 6 analogous to the opening marked 37, but controlled by the valve (not shown) actuated by electromagnet 20.

The small tank 4, mentioned near the beginning of the specification and shown in Fig. 1, is for the purpose of maintaining the pressure approximately constant in the conduit 5 during the operation of the valve device 6. According to one embodiment of the invention, the tank 4 may be combined with the valve 2.

In accordance with the invention, the device utilizes gas which has previously been compressed and dried and thus avoids the freezing which is fatally produced at high altitudes when use is made of compressors employing the surrounding atmosphere as fluid. This is of great advantage when the device is used for controlling guns or other apparatus on airplanes adapted to fly at high altitudes.

It will further be noted that the control device because of its formation and the positioning of its various outlets can easily be employed in any one of a number of positions best suited for a particular situation.

In accordance with Figs. 10 to 15, a simple arrangement is disclosed whereby the control device 6, the valve 2 and the flask 1 are all mounted on a small panel board permitting attachment or detachment as a unit. Moreover, in accordance with the arrangement shown in these figures, the flask 1 may be easily and quickly replaced.

With reference to Figs. 10, 11 and 12, the flask 1, the valve 2 and the valve device 6 are mounted on a panel 61. The valve device 6 is secured to the panel board 61 by rigid means 62. Welding may be used for this purpose. The expansion valve 2 is similarly secured to the panel by means 63.

The panel at its base is provided with a reinforced metal bracket 64 carrying a stud 65 adapted to enter an opening in an aluminum cup 66 which fits snugly over the bottom of the flask 1. Each flask is provided with such a cup 66. As also shown in Fig. 13, a spacing member 67, having an opening for the stud 65, is disposed between the bottom of the flask and the cup. This spacing member is rigid with the flask and the cup.

As shown in Figs. 11 and 14, each flask has a valve controlled laterally projecting nipple 68 which, when the flask is disposed in operative position, enters a receiving socket 69 in the expansion valve 2. When so positioned, the flask and the nipple 68 are drawn tightly to the valve 2 by means of a yoke 70 hinged at 71 to the body of the valve 2. The yoke 70 is provided with a threaded handle 72, the inner end of which (not shown) presses against the neck of the flask 1 when the handle is turned in one direction. A spacing member 73 rigid with the panel 61 is provided to prevent lateral play (see Fig. 11).

It should be manifest, therefore, that each flask can be readily attached or detached from the panel 61 through the means described. Moreover, the means for securing a flask to the panel are such as to permit (within a range) flasks of different diameter to be used interchangeably.

In Fig. 15 there is diagrammatical illustrated a capsule 74 adapted to recharge a flask without removing it from the aircraft. Such flasks are provided with chemicals which react to form gases under pressure when permitted to mix. Thus the flasks may be recharged somewhat in the manner of charging a syphon beverage bottle through means of a capsule.

The arrangements described and illustrated are admirably suited to accomplish the objects and advantages of the invention.

As applied to the gun control system shown in Fig. 1, the invention possesses great advantages. One of the advantages is that by using the invention in such a system the whole system has less lag. Because of the high load required for the trigger operation, a pure electrical system would require solenoids having many coils with the attendant large coil effects and, therefore, subsequent lag. With the present invention, solenoids with few coils and very little lag may be used, and these actuate a pneumatic valve, also having little lag, so that the total lag, electrical and pneumatic, is much less than the lag in a purely electric system.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments.

I claim:

1. A control device for controlling the passage of a medium under pressure, said control device comprising a body having a chamber with two coaxially arranged solenoids therein, and two valve portions disposed in said body symmetrically with respect to said solenoid chamber, each valve portion having a passage and an inlet port, an outlet port and a third port, a valve disposed in each valve portion, a passageway connecting said outlet port with said third port and said inlet port, said valve adapted to connect said passageway alternately with said outlet port and said inlet port or said outlet port with said third port, rocker levers disposed within said body, one at each end, one arm of each rocker lever being positioned in the path of the core of a solenoid, the other arm of each rocker lever being positioned to move a valve when the solenoid is energized.

2. A device as defined in claim 1, the inlet ports in said valve portions being disposed in opposite directions with respect to each other.

JACQUES GUSTAVE MEJEAN.